Gray & Brittingham,

Piston Valve.

No. 4,319. Reissued Apr. 4. 1871.

R. L. Gray
W. B. Brittingham
INVENTORS
D. P. Holloway & Co
Attys

ATTEST
A. Ruppert.
C. F. Clausen

N. PETERS, PHOTO-LITHOGRAPHER, WASHINGTON, D. C.

UNITED STATES PATENT OFFICE.

ROBERT C. GRAY AND WILLIAM B. BRITTINGHAM, OF LA FAYETTE, INDIANA, ASSIGNORS TO THEMSELVES AND JOHN FORDYCE.

IMPROVEMENT IN PISTON STEAM-VALVES.

Specification forming part of Letters Patent No. 86,067, dated January 19, 1869; Reissue No. 4,319, dated April 4, 1871.

*To all whom it may concern:*

Be it known that we, ROBERT C. GRAY and WILLIAM B. BRITTINGHAM, of La Fayette, in the county of Tippecanoe and State of Indiana, have invented a new and useful Improvement in Piston-Valves; and we do hereby declare that the following is a full, clear, and exact description of the same, reference being had to the annexed drawing, making part of this specification, in which—

Figure 3:
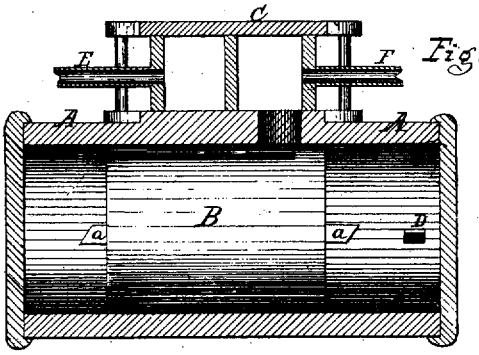
Figure 8:
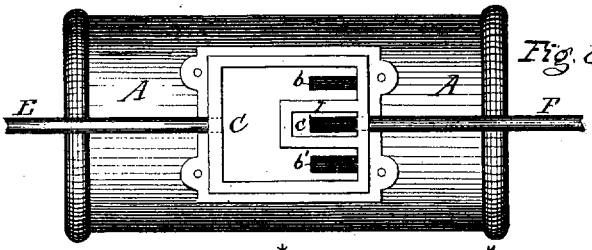
Figure 5:
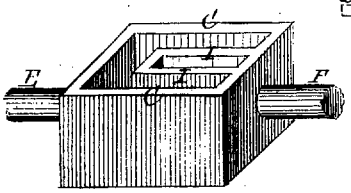
Figure 1:
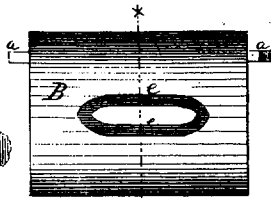
Figure 2:
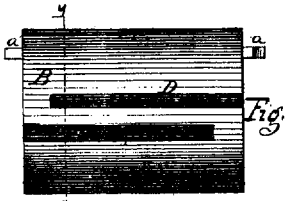
Figure 4:
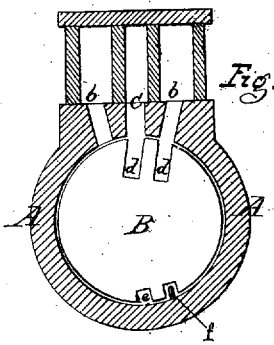
Figure 6:
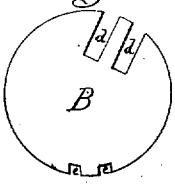
Figure 7:
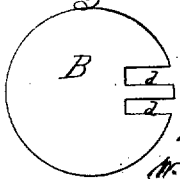
Figure 9:
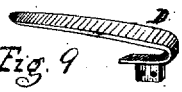

Figure 1 is a side elevation of the piston-valve, showing the cam-shaped groove for partially rotating the same, and also projections upon the ends thereof for the same purpose. Fig. 2 is also a side elevation, showing the ports and end projections. Fig. 3 is a central sectional elevation, showing the partitions within the steam-chest, the ports in the piston, and the cam-shaped groove. Fig. 4 is a transverse section. Fig. 5 is a perspective view of the chest. Fig. 6 is a section of the piston-valve on the line *x x*, Fig. 1. Fig. 7 is a section of the same on the line *y y*, Fig. 2. Fig. 8 is a top view, showing the arrangement of the interior of the chest. Fig. 9 is a perspective view of a spring placed within the cylinder to assist in rotating partially the valve.

The same letters are employed in all the figures in the indication of identical parts.

Our invention relates to what are known as "piston-valves," and particularly to that class in which the piston has not only a reciprocating motion longitudinally, but also an oscillatory motion on its own longitudinal axis; and Our improvement consists in so constructing the piston-valve that the current of steam, water, or other fluid passing through the valve shall give, by its pressure, both a longitudinally-reciprocating and vibratory motion to the piston, oscillating on the axis of the cylinder as a center; also, in arranging within the case through which the fluid flows a valve having a longitudinally-reciprocating motion and a cam which communicates to the piston-valve an oscillatory motion, in which respects our improvement is broadly distinguishable from the old and well-known oscillating piston-valves, which were independently actuated by power derived from another source than the steam passing through the valve itself and applied to a valve-rod extended through a stuffing-box in the end of the valve-chest.

Our improvement further consists in forming the ports in the valve by means of longitudinal and parallel grooves cut in the periphery of the cylindrical piston and extended to such a distance that as the piston travels in its cylinder the continuity of the connection between the ports of the valve and those of the cylinder may be maintained, whereby we are able to secure that continuous flow of liquid through the valve, when used as a meter, which we deem essential to the perfect action of such an instrument.

Also, we have invented new and useful improvements in the details of construction, combination, and arrangement, which will be hereinafter indicated and claimed.

In the annexed drawing, A represents the cylinder of a water-meter closed by heads; but if used as the cylinder of a steam-engine, it would only be necessary to attach to the piston a piston-rod in such manner as to permit the requisite oscillation of the piston; for, although we shall herein describe this improvement as principally applicable to steam-engines, it is apparent that it is equally adapted to the use of water, gas, or any other substance which may be used as a motive power, or for a fluid-meter.

Within the cylinder plays a piston, B, fitted neatly to the bore of the cylinder, and having longitudinal ports cut in the periphery of the cylindrical piston. These ports extend from each end of the piston, as clearly shown at *d d* in Fig. 2, to such a distance as will serve to maintain a continuous flow through the piston of both the induction and eduction current. This is essential to the proper action of a water-meter, which requires a continuous flow of the water through the meter. The short openings through the ports of the valve, heretofore used in steam-valves of this class, will not answer for a water-meter, as they would deliver the water only in spurts.

In addition to its reciprocating longitudinal movement, the piston has at each end of its stroke an oscillatory rotation on its own axis to a distance sufficient to reverse the ports in their relation to the induction and eduction ports through the cylinder. This motion is effected by the cam-groove *e* in the piston. (Shown in Fig. 1.)

A pin, *f*, which may carry a friction-roller, is fastened into the inner face of the cylinder in such position that it will enter the groove *e*. When the steam, water, &c., entering through the port for the time acting as an induction-port, presses the piston toward the other end of the cylinder until it has approached nearly to the end of the stroke, the pin *f* will cause the piston partially to rotate on its own axis, thereby reversing the ports and causing the piston to be moved in the opposite direction.

The ports through the cylinder are clearly shown in Fig. 8, at *b b′ c*, of which the two outer ones *b*, *b′*, are induction-ports, and the middle port, *c*, is the eduction-port.

The chest C is divided into two compartments by the rectangular partition I, arranged within the chest to inclose the eduction-port *c*.

The eduction-pipe E opens into the chamber formed between the chest C and the partition I, from which the ports *b b′* communicate with the ports of the piston-valve alternately.

The eduction-pipe F leads out of the chamber formed within the partition I, which is placed immediately above the eduction-port *c*.

It may be desirable to assist the rotary motion of the piston in certain supposable cases; and, if so, we propose to do so by placing springs D in the ends of the cylinder A, in proper position to receive the beveled lugs *a*, attached to the ends of the piston B, and having such form and arrangement that when the pressure of steam, water, &c., against one end of the piston has forced it nearly to the opposite end of the cylinder, the inclined edge of the lug *a*, pressing against the spring D, will compress the latter, which, reacting, will tend to turn the piston in the required direction.

In operating this valve the steam, water, or other operative fluid is introduced through the induction-pipe E, and, passing through the induction-port *b′*, Fig. 8, into the port *d* in the valve, and through this into the space between the end of the valve and the head of the cylinder, and, by its pressure, forcing the piston toward the other end of the cylinder. At the instant that the stroke is completed the groove in the cam *e* will rotate the piston to such an extent that the port in the valve which has been an induction-port will be moved under the port *c* of the cylinder and become an eduction-port, through which the fluid will escape into the pipe F, while the valve-port which was the eduction-port, being moved under the induction-port *b*, becomes an induction-port to admit the fluid to the opposite end of the cylinder. Thus the piston is made to traverse the cylinder alternately in each direction, the valve-ports being reversed automatically by the pressure of the same stream or current of fluid which gives to it its longitudinal motion.

What we claim as our invention, and desire to secure by Letters Patent, is—

1. A piston-valve which has both a longitudinally-reciprocating and an oscillating motion on its axis, derived from the current of fluid which passes through the valve.

2. In combination with induction and eduction-openings in a cylinder, A, a cylindrical valve, when such valve has both a longitudinally-reciprocating and a vibratory motion, derived from the pressure of the fluid which passes through the valve.

3. The arrangement within the case through which the fluid flows of a valve and cam, in such relation to one another that the cam shall communicate a vibratory movement to the longitudinally-reciprocating valve.

4. The piston-valve B, constructed with ports or passages in its periphery, which ports act alternately as induction and eduction passages, the necessary changes of position being effected by a cam actuating the valve and operating by the pressure of the current which passes through the valve.

5. A piston-valve having parallel induction and eduction ports, when such ports are cut in its periphery, to maintain the constant flow of the operating fluid while it traverses the bore of the cylinder, substantially in the manner set forth.

6. The combination and arrangement of the ports *d d* of the valve and the passages *b*, *b′*, and *c* of the cylinder.

7. The combination of the piston-valve B and stem or lug *a* with the part D, supported on the cylinder, when the surfaces are so formed that the pressure of the fluid on the piston will cause it to partly rotate.

8. The arrangement of the partitions within the chest C, substantially as set forth.

9. The arrangement of the ports and pipes of induction and eduction in relation to the compartments of the chest C, substantially as set forth.

10. The combination of the cylinder A, pin *f*, piston B, and groove *e*, substantially as described.

In testimony whereof we have signed our names to the foregoing specification in the presence of two subscribing witnesses.

ROBT. C. GRAY.
W. B. BRITTINGHAM.

Witnesses:
WM. BROUWER,
E. B. COLLINS.